(12) United States Patent
Amano et al.

(10) Patent No.: US 6,695,730 B2
(45) Date of Patent: Feb. 24, 2004

(54) DRIVING UNIT AND TENSIONER

(75) Inventors: Tanehira Amano, Nagano (JP); Takao Kobayashi, Nagano (JP)

(73) Assignee: NHK Spring Co., Ltd., Kanagawa (JP)

( * ) Notice: Subject to any disclaimer, the term of this patent is extended or adjusted under 35 U.S.C. 154(b) by 28 days.

(21) Appl. No.: 09/912,602

(22) Filed: Jul. 26, 2001

(65) Prior Publication Data
US 2002/0037782 A1 Mar. 28, 2002

(30) Foreign Application Priority Data
Jul. 31, 2000 (JP) ........................ 2000-266214

(51) Int. Cl.[7] ................................. F16H 7/22
(52) U.S. Cl. ........................ 474/101; 474/110
(58) Field of Search ................ 474/101, 110, 474/109, 111, 112

(56) References Cited

U.S. PATENT DOCUMENTS

| | | | | |
|---|---|---|---|---|
| 4,190,025 A | * | 2/1980 | Wahl | 123/195 A |
| 4,808,148 A | * | 2/1989 | Holtz | 474/112 |
| 5,033,992 A | * | 7/1991 | Ojima | 474/111 |
| 5,106,344 A | * | 4/1992 | Ojima | 474/117 |
| 6,193,621 B1 | * | 2/2001 | McClosky | 474/101 |

FOREIGN PATENT DOCUMENTS

DE 3623903 C1 * 12/1987 ............. F01L/1/02

* cited by examiner

Primary Examiner—David Fenstermacher
(74) Attorney, Agent, or Firm—Lowe Hauptman Gilman & Berner, LLP

(57) ABSTRACT

A tensioner, in which a bearing of the drive shaft is not necessary and the initial load of the torsion spring is maintained when the tensioner is disassembled, two shaft members that compose a set and that are engaged by screw portions, and a spring that is inserted in the driving unit by fastening onto the shaft members the hooking portions that are located at each end of the spring. The spring is inserted in the set of the shaft members under an appropriate windup condition. One shaft member moves forward from the loaded strength by the spring. The tensioner also includes, beside the driving unit, a case into which the driving unit is inserted, and a system that prevents the driving unit from coming off the case.

4 Claims, 17 Drawing Sheets a cross-section view along the line F

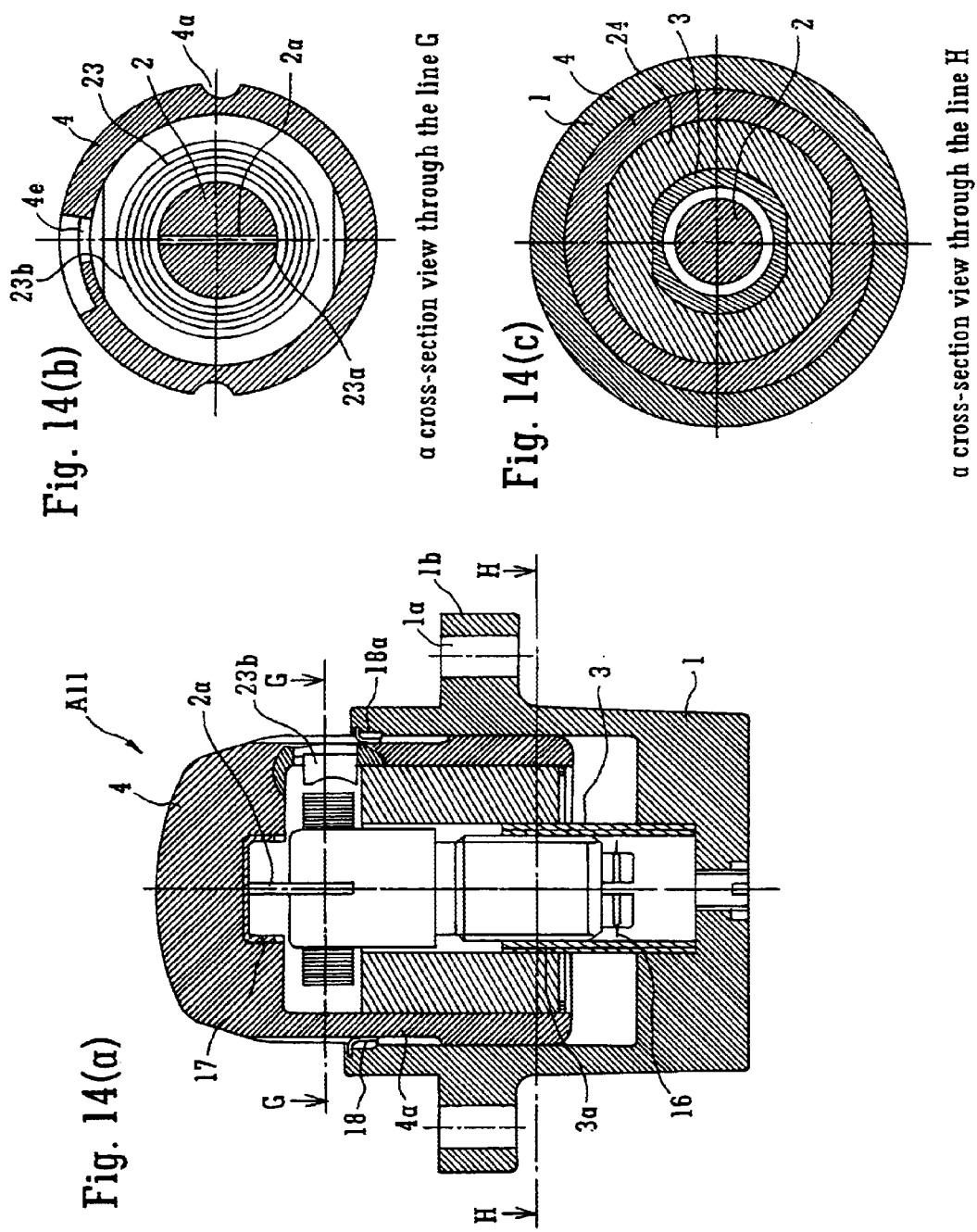

E-E

E-E

E-E

DRIVING UNIT AND TENSIONER

BACKGROUND OF THE INVENTION

1. Field of the Invention

The present invention relates to a tensioner for maintaining constant tension of a non-ended belt, a chain, or the like.

2. Description of the Related Art

A tensioner is a device for maintaining constant tension of a chain, timing belt, or the like that is used, for example, for an engine of an automobile or a motorbike, by pushing or pulling the chain or timing belt in a certain direction if the chain or timing belt becomes loose or slack.

FIG. 18 is an illustration showing an example of a tensioner that is actually installed in the main body of an engine 100. In this engine 100, a non-ending chain 103 encircles a set of two cam sprockets 101 and a crank sprocket 102. The tensioner A has a curve-shaped chain guide 104 that makes contact with the aforementioned timing chain 103 and guides that chain. This chain guide 104 is installed in a free-moving condition with a base portion 105 as a supporting point. Then, by the moving of the chain guide 104 by a retractable and extensible drive shaft 106 of the tensioner A, the tension of the timing chain 103 is adjusted.

FIG. 17(a) shows a conventional tensioner. Such a tensioner A is inserted into a case 51 along with a rotating shaft 52 and a drive shaft 53. The case 51 is to be installed in an apparatus such as an engine, and a flange 51b is formed with an external protrusion in which a hole 51a is formed for the purpose of such installation.

In order to connect the rotating shaft 52 to the drive shaft 53, a male screw portion is formed on the outer surface of the rotating shaft 52 while a female screw portion is formed on the inner surface of the drive shaft 53, and said imposition is done by engaging said screw portions. The rotating shaft 52 and the drive shaft 53, which are connected to each other, are supported inside the case 51 by the back-end portion 52a of the rotating shaft 52 being connected with the case 51 by interfitting said back-end portion 52a with an interfitting hole 59 of the case 51. Also, when the drive shaft 53 is connected with the rotating shaft 52 it is engaged on the front-side part of the rotating shaft 52 to approximately one-half of the overall length of said rotating shaft 52, and a torsion spring 54 is installed at the back-side part of the rotating shaft 52 for the approximately one-half of the overall length of said rotating shaft 52 with which the drive shaft 53 is not engaged.

One end 54a of the torsion spring 54 is fastened onto the rotating shaft 52 from the direction crossing the axial direction while the other end 54b is fastened onto the case 51. Accordingly, when assembled under the condition that the torsion spring is twisted to have a specified torque, the rotating shaft 52 rotates due to the loaded strength of the torsion spring 54.

The drive shaft 53 is in a tube whose cross-section is not circular and into which the approximately front half of the rotating shaft 52 is inserted in the condition of engagement. The part of the drive shaft 53 that engages with the rotating shaft 52 is supported by a bearing 55. This bearing 55 is fixed on the tip part of the case 51.

FIG. 17(b) is a cross-section view of such a bearing 55, and in which in this example has a drive-shaft hole 55a (a hole in which the drive shaft 53 slides while contacting the inner surface thereof) that has a noncircular, approximately oval shape. The peripheral cross-section of the drive shaft 53 has the same shape as the drive-shaft hole 55a, and by inserting said drive shaft 53 into said drive-shaft hole 55a bearing 55 the rotation of the drive shaft 53 is stopped.

In the constitution described above, even if the loaded strength of the torsion spring 54 acts upon the rotating shaft 52 so as to rotate the rotating shaft 52, the drive shaft 53, which is engaged with the rotating shaft 52, does not rotate. Therefore, the loaded strength of the torsion spring 54 that rotates the rotating shaft 52 is converted into the driving force of the drive shaft 53 and the drive shaft 53 moves forward. By this movement, because the drive shaft 53 constantly presses against the timing belt and the chain, they are maintained at a constant level of tension.

In such a structure, on the front-end tip of the aforementioned shaft 53 a cap 56 is installed, and this cap 56 contacts directly or indirectly with the chain or the timing belt as shown in the aforementioned FIG. 17(a). Though not shown in the figures, the back-end portion of the case 51 is sealed by the engagement of a sealing bolt so as to prevent the invasion of dust, water, or other undesired substances. Further, the aforementioned tensioner A is a tensioner of a pushing-type, but a tensioner of a pulling type also is also available.

In the tensioner A of which the structure is described above, if the rotating shaft 52 and the drive shaft 53 are removed from the case 51 by mistake, the initial load previously given to the torsion spring 54 becomes zero, because one end of the torsion spring 54 is fastened on the rotating shaft 52 while the other end is fastened on the case 51, as described above. Accordingly, the reassembly of the rotating shaft 52 and the drive shaft 53 and the reinserting of them into the case 51 is to be done after the torsion spring 54 is wound a specified number of times in order to have an initial load, but sometimes the appropriate number of windings of the torsion spring to have the initial load for such a tensioner is not known. Also, it is extremely difficult to latch both ends of the torsion spring 54 in the condition that the initial load is given as described above.

Also, in the tensioner A, of which the structure is as described above, for converting the rotation torque by the torsion spring 54 into driving force in the axial direction, it is necessary to stop the rotation of the drive shaft 53 by the restraining force of the bearing 55. Therefore, the drive shaft 53, of which the surrounding cross-section shape is formed to be in an approximately oval shape, is inserted into the bearing 55, which has a similar oval-shaped engagement hole, as a result of which the rotation of the drive shaft 53 is stopped, as shown in FIG. 17(b).

However, the problem is that, in order to stop the rotation of the drive shaft, it is necessary to form the cross-section shape thereof into such a noncircular shape as an oval shape, which takes time to do and is troublesome.

Furthermore, the aforementioned bearing 55 is of a plate-shaped member a few millimeters thick, to be manufactured by a press, pattern molding, or the like. The thicker the bearing 55 is, the more steadily the same supports the drive shaft 53 so as to stabilize the operation thereof However, the problem is that, when the bearing 55 is thicker, either the effective stroke length of the drive shaft 53 is forced to be reduced or the storage space of the torsion spring 54 is reduced in the axial direction by the increased thickness.

SUMMARY OF THE INVENTION

The present invention is intended to overcome the aforementioned problems, and its purposes are (1) to provide a drive shaft that enables the initial load of the torsion spring to be retained when the tensioner is removed for maintenance purposes or the like, and also that does not need a bearing to stop the rotation of the drive shaft as is conventionally done, that does not need processing to form the cross-section of the drive shaft to be in a noncircular shape, and does not need to reduce the effective stroke length of the drive shaft or the storage space of the torsion spring; and (2) to provide a tensioner using such a drive shaft.

To attain the aforementioned purposes, the invention set forth in claim 1 is characterized such that it has two shaft portions that compose a set and that are engaged by two screw members, and a spring that has at each of its two ends a hooking portion that is fastened onto one of the aforementioned the two shaft members.

Also, the invention set forth in claim 2 is characterized such that it has two shaft portions composing a set engaged by a screw portion, a spring that has at each of its two ends a hooking portion, each of which is fastened onto one of the aforementioned two shaft members, a case into which the set of the two shaft members and the spring are inserted and that supports one shaft member, and a cap that is supported by the case in the condition of free sliding and that supports the other shaft member. The invention set forth in claim 3 is characterized such that it has two shaft portions composing a set engaged by a screw portion, a spring that has at each of its two ends a hooking portion, each of which is fastened onto one of the aforementioned two shaft members, a case into which the set of the two shaft members and the spring are inserted and that supports one shaft member, with the other shaft member being supported by the aforementioned case in the condition of free sliding. Furthermore, the invention set forth in claim 4 is characterized such that it has a hydraulic system that applies oil pressure, in the same direction as the driving direction of the shaft member, to the load that is input to the aforementioned shaft member.

By the constitution described above, the initial load is maintained when the tensioner is disassembled for maintenance purposes or the like, so that reassembly is made easier. In addition, because the bearing that is typically used in a conventional tensioner is not needed, the assembly of said tensioner is made easier and both hence the number of the personnel work hours needed for assembly and the number of the items needed for assembly can be reduced. Also, extra space in the thickness of the aforementioned bearing that is not needed in this tensioner can be used for the effective stroke length of the drive shaft or for storage space for the torsion spring. Moreover, because a cap slides along the wide contacting surface in the aforementioned case, sliding stability of said cap is improved. Furthermore, the first action of the aforementioned hydraulic system is to perform a buffer action against the high load from the engine.

BRIEF DESCRIPTION OF THE DRAWINGS

FIG. 14 contains illustrations showing the tensioner A11 of the eleventh embodiment. FIG. 14(a) is a cross-section view of the principal part of the main body, FIG. 14(b) is a cross-section view along the line G, and FIG. 14(c) is a cross-section view along the line H.

DESCRIPTION OF THE PREFERRED EMBODIMENTS

Figure 1:
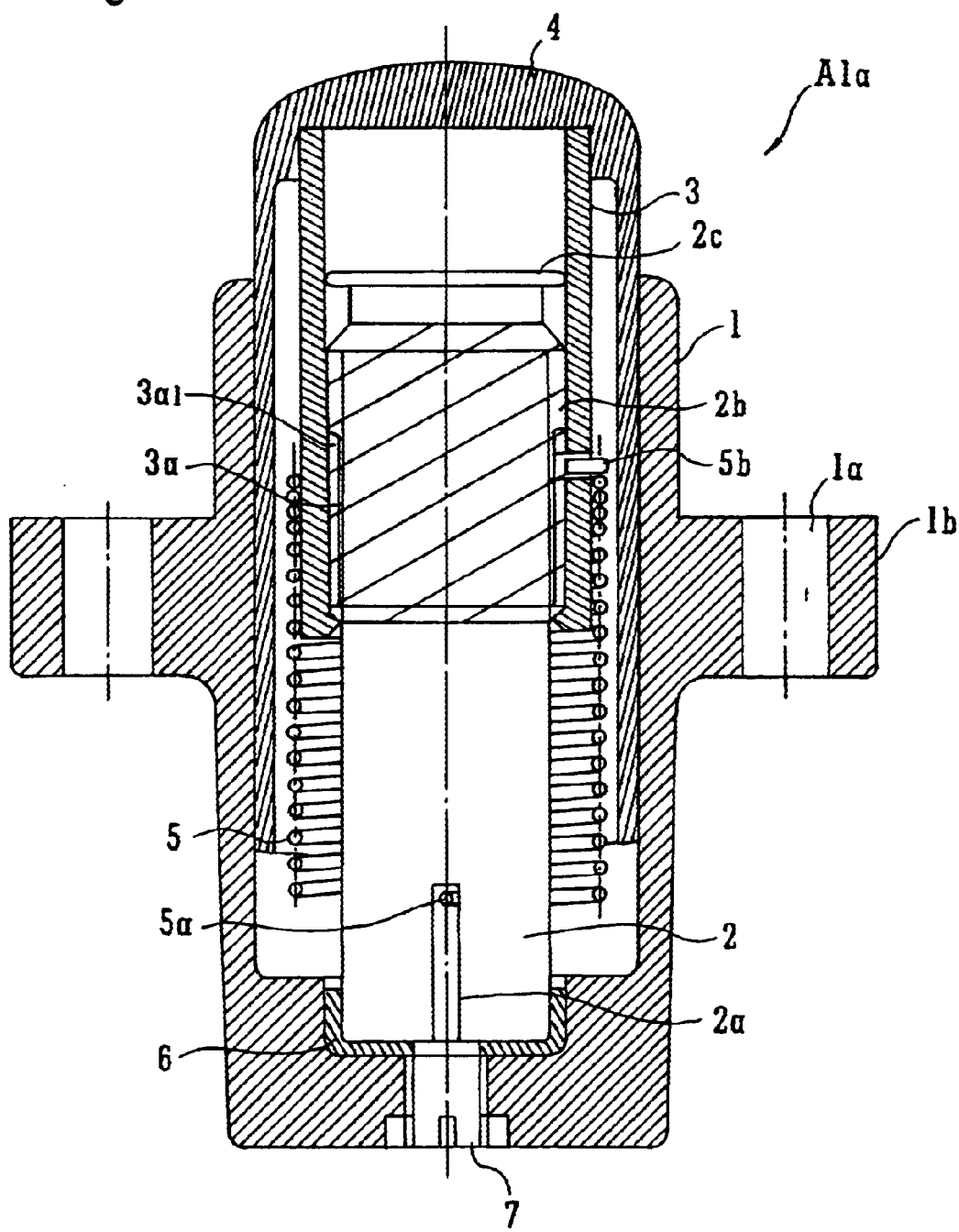
FIG. 1 is an illustration showing the tensioner A1a as the first embodiment of the present invention.

The embodiments of the present invention are described in details as follows with reference to drawings.
The First Embodiment FIG. 1 is an illustration showing a tensioner as the first embodiment of the present invention. This tensioner A1a consists of the first shaft member 2 as the rotating shaft, the second shaft member 3 as the drive shaft, a cap 4 that is fixed on this second shaft member 3, and a torsion spring 5.

Also furnished are (1) a flange 1b, in which an installing hole 1a, which is meant to be used in installing the tensioner A1a in an engine or the like, and (2) a shaft receiver 6 for receiving the first shaft member 2, which is rotating. At the bottom of the tensioner A1a there is formed a seal-bolt hole 7 for engaging a sealing bolt, which is not shown in the drawing. Such constitution is the same as that of a conventional tensioner as described earlier.

At the bottom of the aforementioned first shaft member 2 is a slit 2a, and on the exterior upper peripheral surface of said first shaft member 2 is a male screw portion 2b. Then, in the top portion, a collar-shaped stopper 2c protrudes so as to prevent the second shaft member 3 from coming off.

On the inner peripheral surface of the aforementioned second shaft member 3 is a female screw portion 3a that is to be engaged with the male screw 2b of the aforementioned first shaft member 2. When the first shaft member 2 rotates due to the elastic action of the torsion spring 5, the second shaft member 3 moves forward, and the upper end 3a1 of the female screw portion 3a makes contact with the stopper 2c of the first shaft member 2 so as to prevent further movement of the second shaft member 3, as a result of which the system prevents the second shaft member 3 from coming off the first shaft member 2.

The upper portion of the cap 4 is supported by the tip of the second shaft member 3 in the condition of free rotation, and it extends downward, maintaining a specified space between it and the outer peripheral surface of the second shaft member 3, so as to cover the outer peripheral surfaces of said second shaft member 3 and of the first shaft member 2. Then, the outer peripheral surface of the cap makes contact with the inner peripheral surface of the case 1 in the condition of possible sliding.

The torsion spring 5 is inserted in the inner peripheral part of the cap 4, namely, the outer peripheral part of the of the first shaft member 2 and the second shaft member 3, and the hooking portion 5a at one end thereof is fastened on the aforementioned slit 2a at the bottom portion of the first shaft member 2, while the hooking portion 5b at the other end is fastened on the side surface of the second shaft member 3.

As described above, the aforementioned moving unit consists of the first shaft member 2, the second shaft member 3, the cap 4, and the torsion spring 5. A similar structure is found in the other embodiments described below.

In the tensioner A1a, whose constitution is described above, when the load inputted to the cap 4 becomes weaker than is intended, the first shaft member 2 and the second shaft member 3 rotate due to the elastic force of the torsion spring 5. As a result of said rotation, the second shaft member 3 and the cap 4, which is supported by said second shaft member 3 in the condition of free rotation, move forward. In contrast, when the load inputted to the cap 4 becomes stronger than is intended, then the cap 4, the second shaft member 3, and the first shaft member 2, which is supported by said second shaft member 3 in the condition of free rotation, move backward while rotating so as to maintain the desired level of tension. The second shaft member 3 supports the cap 4 in the condition of free rotation, and the cap 4, the outer peripheral surface of which widely makes contact with the inner peripheral surface of the case 1, is supported steadily and concentrically against the offset load that is being received diagonally.

Further, in this embodiment, a system to prevent the aforementioned driving unit from coming out of the case 1 is not furnished.

As described above, where the structure is such that the first shaft member 2, the second shaft member 3, the cap 4, and the torsion spring 5 are assembled together as one body as a drive shaft, said drive shaft can be removed in an intact condition without disassembling it when the tensioner is disassembled. Also, while tension is being maintained, both the first shaft member 2 and the second shaft member 3 rotate, as a result of which a bearing to stop the rotation of the drive shaft as in the conventional art is not needed, and it is not necessary that the cross-section of the second shaft member as the aforementioned drive shaft be in a noncircular shape.

Also, because the contact surface between the cap 4 and the case 1 is broad, the sliding stability at the time of operation is improved. This is an action that is common to all of the embodiments, except the third embodiment (see FIG. 5), the twelfth embodiment (see FIG. 15) and the thirteenth embodiment (see FIG. 16).

Furthermore, the first shaft member 2, as a rotating shaft of the base-end side in the conventional art, and the cap 4 are both retained in the case 1, as a result of which the second shaft member 3, which moves forwards, can coaxially rotate and slide so as to stabilize the operation of the driving unit.

Figure 2:
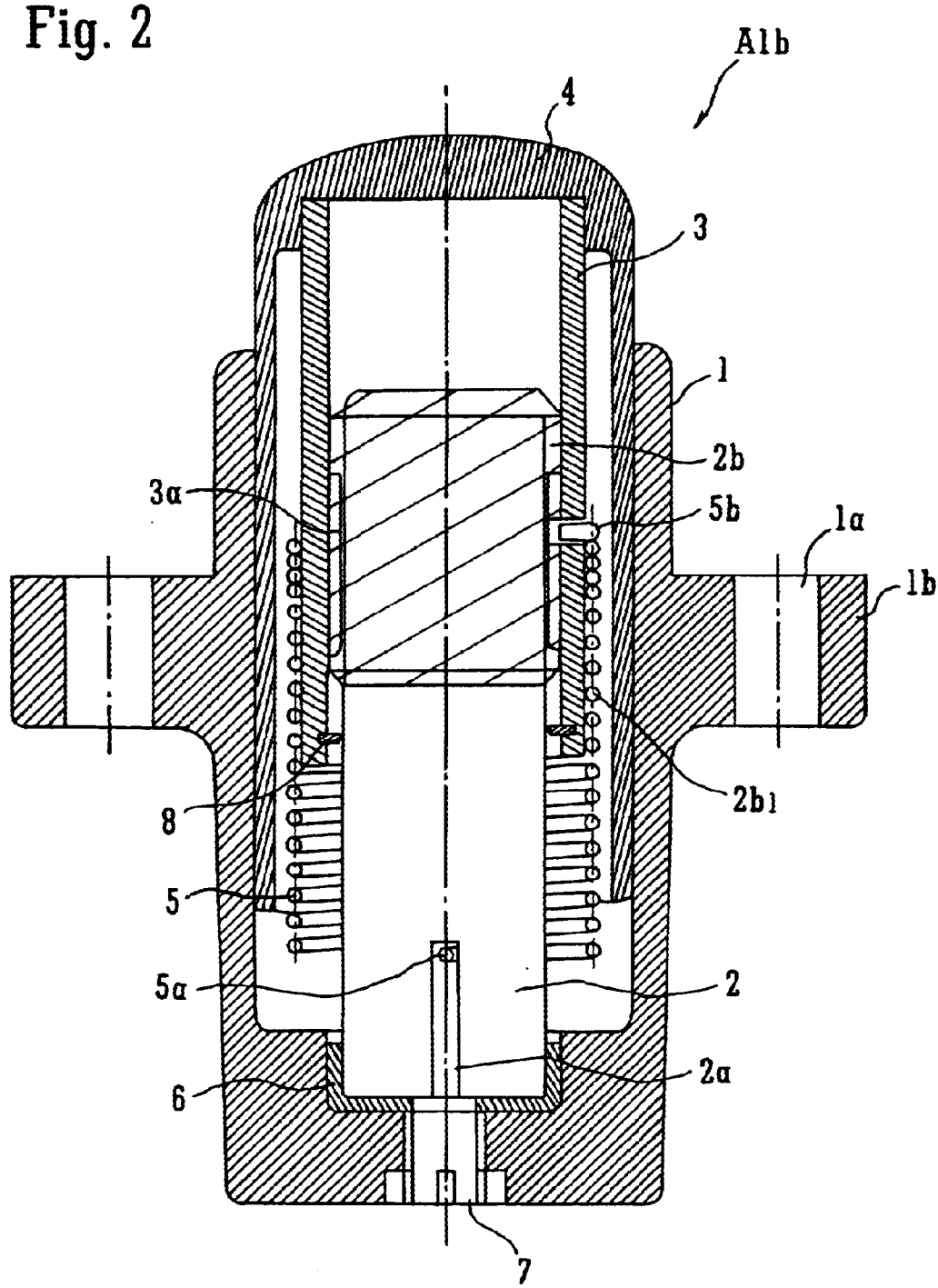
FIG. 2 is an illustration showing the tensioner A1b, another embodiment of the aforementioned tensioner.

FIG. 2 is an illustration showing another example of the first embodiment. The constitution of the main parts of this tensioner A1b is the same as that of the aforementioned tensioner A1a, but this tensioner A1b's system for preventing the second shaft member 3 from coming off the first shaft member 2 is different from that of the aforementioned tensioner A1a. In this example, a protruding ring 8 is installed as a stopper on the lower inner peripheral surface of the second shaft member 3. Then, when the second shaft member 3 moves forward as a result of it being rotated, the protruding ring 8 makes contact with the lower portion 2b1 of the male screw portion 2b of the first shaft member 2 so that further forward movement becomes impossible, thereby serving to prevent the second shaft member 3 from coming off the first shaft member 2.

Figure 3:
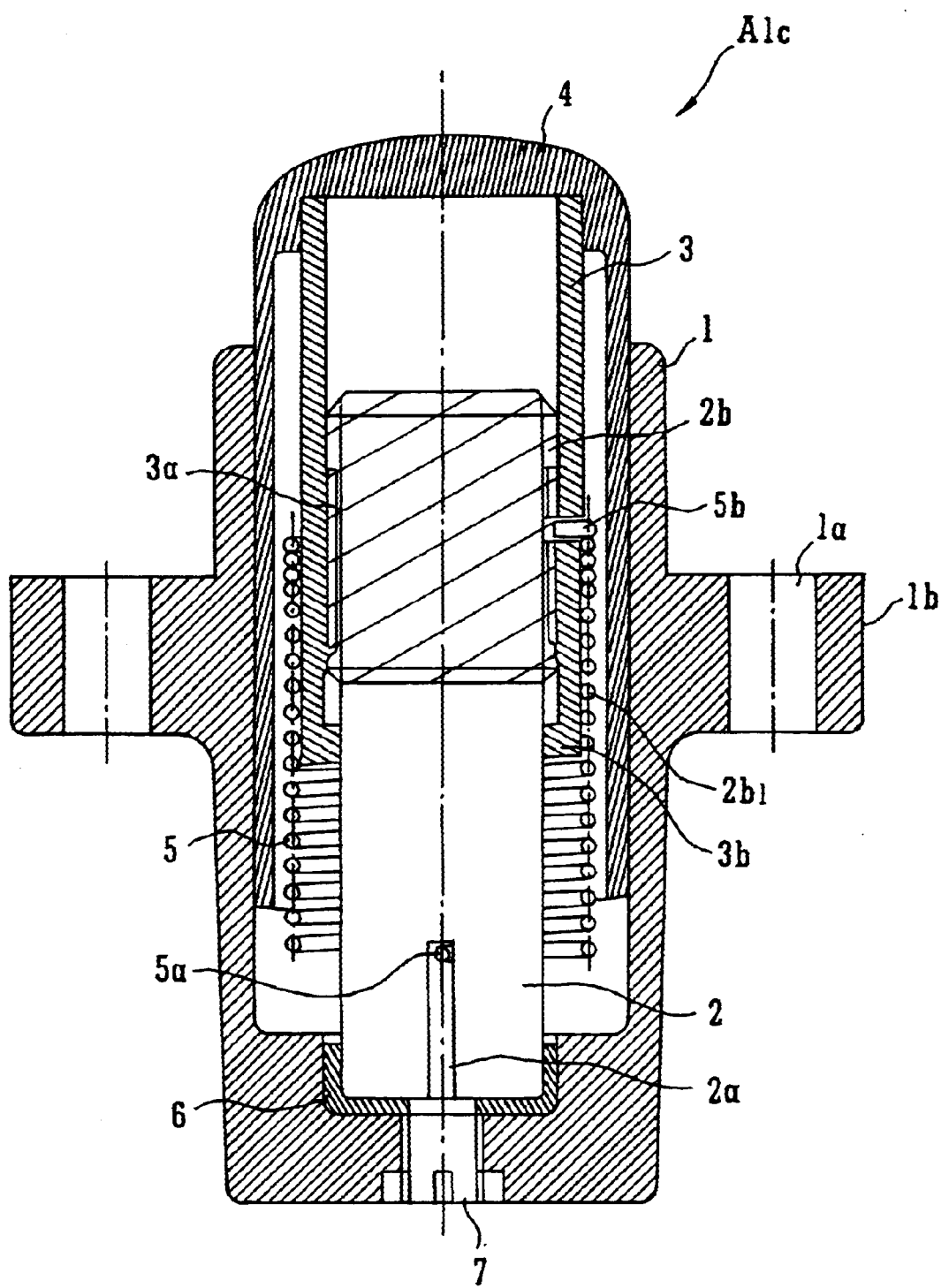
FIG. 3 is an illustration showing the tensioner A1c, another embodiment of the aforementioned tensioner.

FIG. 3 is an illustration showing another example of the first embodiment. The constitution of the main parts of this tensioner A1c is the same as that of the aforementioned tensioner A1a, but this tensioner A1c's system for preventing the second shaft member 3 from coming off the first shaft member 2 is different from those of both of the aforementioned tensioners A1a and A1b. In this example, a protruding portion 3b protrudes as a stopper from the lower-end inner peripheral surface of said second shaft member 3. Then, when the second shaft member 3 moves forward as a result of it being rotated, the protruding portion 3b as a stopper makes contact with the lower portion 2b1 of the male screw portion 2b of the first shaft member 2 so that further forward movement becomes impossible, thereby serving to prevent the second shaft member 3 from coming off the first shaft member 2.

The Second Embodiment

FIGS. 4(a)–4(d) are illustrations showing the second embodiment of the present invention. In this embodiment, the tensioner A2 is a type of tensioner such that the tip portion of the first shaft member 2 makes contact with a concave portion formed in the upper internal surface of the cap 4 in the condition of possible sliding, so that this first shaft member 2 moves forward. That is to say, at the lower end of the first shaft member 2, a stopper 2c that protrudes in the circumferential direction like a collar is formed, and a slit 2a is formed in the upper portion of the first shaft member 2. Then, as shown in FIGS. 4(b)–4(d), the male screw portion 2b of the first shaft member 2 and the female screw portion 3a of the second shaft member 3 are engaged. The lower end 3c of the second shaft member 3 makes contact with the case 1.

The torsion spring 5 is inserted in the outer peripheral part of the second shaft member 3, and the hooking portion 5a of one end of said torsion spring 5 is fastened on the aforementioned slit 2a of the first shaft member 2 while the hooking portion 5b of the other end of the torsion spring 5 is fastened on the lower-side surface of the second shaft member 3. As described above, the lower end 3c of the second shaft member 3 makes contact with the case 1 so as not to descend, as a result of which the first shaft member 2 moves forward as shown in FIG. 4(d) when the elastic force of the torsion spring 5 acts. When this movement is finished, the stopper 2c of the first shaft member 2 makes contact with the lower end 3a2 of the female screw portion 3a of the second shaft member 3 so as to prevent further forward movement.

The cap 4 makes contact with the tip of the first shaft member 2 in the condition of possible sliding, and the outer peripheral surface of the cap 4 makes contact with the inner peripheral surface of the case 1 in the condition of possible sliding. In this case, a protruding snap ring 1c is installed at the intended position of the inner peripheral surface of the case 1. Then, a longitudinal groove 4a is formed in the axial direction of the outer peripheral part of the cap 4 so as to engage with the aforementioned snap ring 1c. The cap 4 moves forward while the snap ring 1c and the longitudinal groove 4a are engaged. Such a longitudinal groove 4a is not formed in the lower portion of the cap 4, and therefore in the proceeding cap 4 the lower end 4a1 of the longitudinal groove 4a makes contact with the protruding snap ring 1c, and the two together function as a stopper that prevents the driving unit—composed of the cap 4, the first shaft member 2, the second shaft member 3, and the torsion spring 5—from coming out of the case 1, which increases the safety of the tensioner.

Also, in this embodiment, the second shaft member 3, as the aforementioned rotating shaft of the base end of the driving unit in the conventional art, and the cap 4 are both retained in the case 1, as a result of which the first shaft member 2, which moves forward is enabled to rotate coaxially so as to stabilize the operation of the driving unit. Also in each of the embodiments described below, except the third, twelfth, and thirteenth embodiments, the constitution thereof is such that the first shaft member 2 or the second shaft member 3, which are to be in the base end of the driving unit and the cap 4 are contained in the case 1, and that stable operation of the driving unit is ensured through these embodiments.

The Third Embodiment

Figure 4:
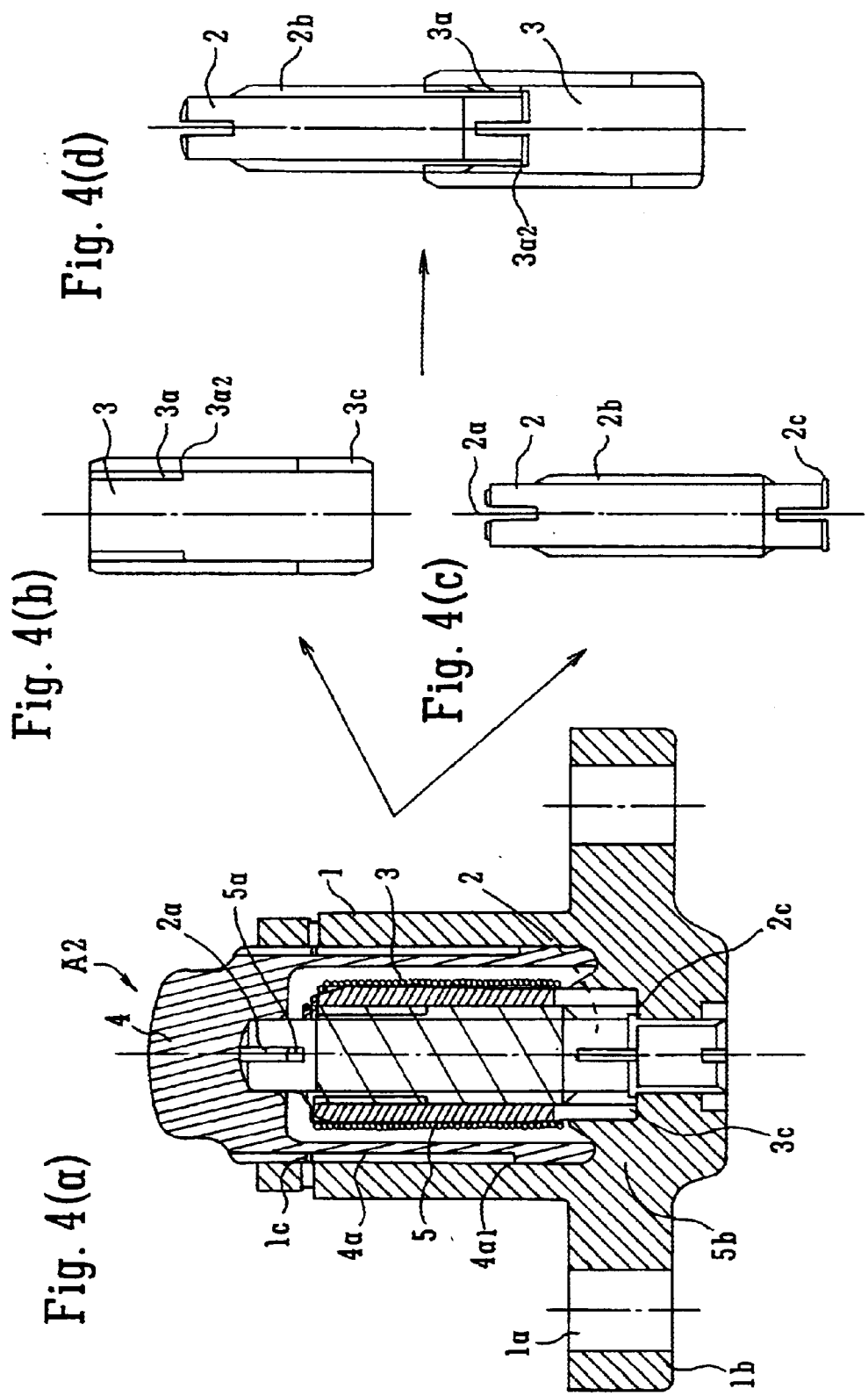
FIG. 4(a) is an illustration showing the tensioner A2 of the second embodiment.
FIGS. 4(b), 4(c), and 4(d) are illustrations showing the engagement condition of the first shaft member and the third shaft member.
Figure 5:
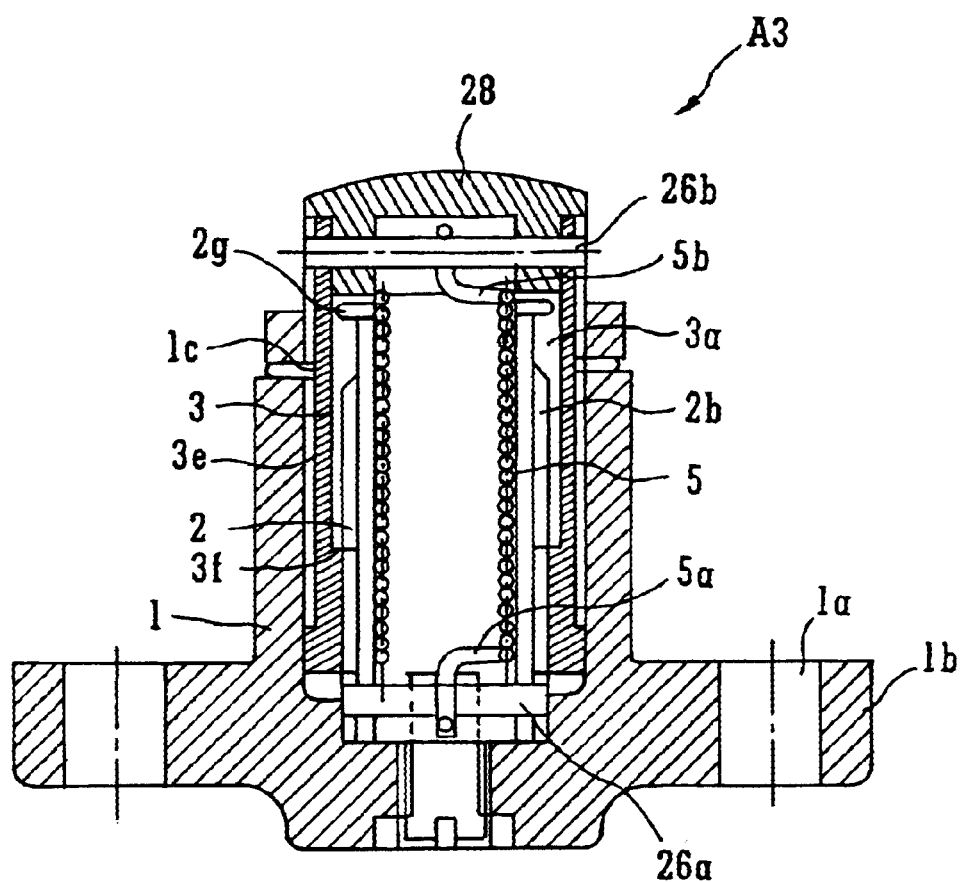
FIG. 5 is an illustration showing the tensioner A3 of the third embodiment.

FIG. 5 is an illustration showing the third embodiment of the present invention. The tensioner A3 is an example of one in which the first shaft member 2 is hollow and the torsion spring 5 is inserted inside said first shaft member 2, in contrast to the aforementioned tensioner A2 of the second embodiment shown in FIG. 4. Then a slotting portion is formed in the lower-end portion of the first shaft member 2, and a pin 26a is inserted into this slotting portion at a right angle to the axial direction, and a hooking portion 5a of one end of the torsion spring 5 is fastened onto this pin 26a.

The outer peripheral portion of the first shaft member 2 includes a male screw portion 2b that is engaged with a female screw portion 3a that is located in the inner peripheral portion of the second shaft member 3. A head member 28 is installed atop the upper portion of the second shaft member 3. Then a pin 26b pierces through the second shaft member 3 and the head member 28, and the hooking portion 5b of the other end of the torsion spring 5 is fastened onto said pin 26b.

The outer peripheral surface of the second shaft member 3 makes contact with the inner peripheral surface of the case 1 in a condition of possible sliding. The snap ring 1c is installed at a specified position on the upper inner peripheral surface of the case 1 so as to protrude, while in the outer peripheral part of the second shaft member 3 a longitudinal groove 3e is formed in the axial direction so as to interfit with the aforementioned protruding snap ring 1c. The second shaft member 3 moves forward under the condition that the snap ring 1c and the longitudinal groove 3e are interfitted. This longitudinal groove 3e is not formed in the lower portion of the second shaft member 3, and therefore in the second shaft member 3, which moves forward, the lower portion of the longitudinal groove 3e makes contact with the protruding snap ring 1c and the two together function as a stopper so as to prevent the driving unit—composed of the head member 28, the first shaft member 2, the second shaft member 3, and the torsion spring 5—from coming out of the case 1.

Also, a stopper 2g that protrudes toward the outer peripheral direction is installed at the upper end of the first shaft member 2, and the lower-end portion 3f of the second shaft member 3, which is moving forward, makes contact with the aforementioned stopper 2g so as to prevent further forward movement of said second shaft member 3 so as to prevent said second shaft member 3 from coming off the first shaft member 2.

As described above, the tensioner A3 of this embodiment is characterized such that the torsion spring 5 is installed inside the first shaft member 2, as a result of which the device can be made in smaller sizes if desired.

The Fourth Embodiment

FIG. 6 is an illustration showing the fourth embodiment of the present invention. In the tensioners A4a, A4b, and A4c of this embodiment, the basic constitution and the action thereof are the same as those of the aforementioned tensioner A2 of the second embodiment, as shown in FIG. 4, but the tip part of the first shaft member 2 is different. That is to say, in the tip part of the first shaft member 2, the aforementioned slit 2a is not formed, while a fastening hole 2d is formed in the upper-side surface of the first shaft member 2, and the hooking portion 5a of one end of the torsion spring 5 is fastened onto this fastening hole 2d. Then, in the tensioner A4a shown in FIG. 6(a), a groove is formed in the upper surface of the tip portion of the first shaft member 2, and an edge 2e that surrounds this groove makes contact with the concave portion that is formed in the cap 4 in the condition of contacting the surface of the first shaft member 2. With such a constitution, it is not necessary to form a slit 2a in the upper end of the aforementioned first shaft member 2, and therefore the sliding part between the cap 4 and the first shaft member 2 becomes a continuous surface so that operating stability is improved.

Figure 6A:
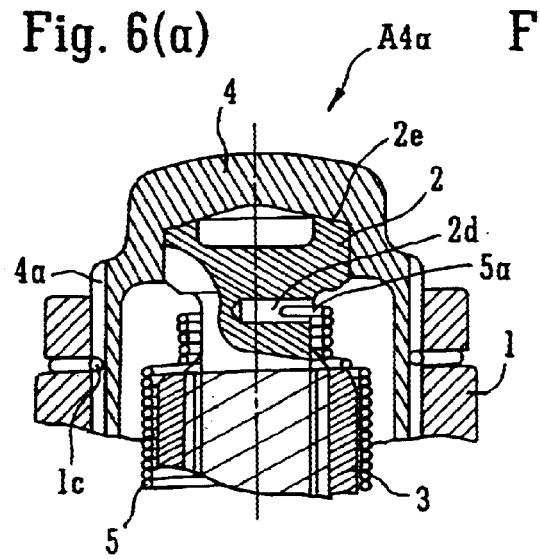
FIG. 6 contains partial views showing the tensioners A4a, A4b, and A4c of the fourth embodiment.
Figure 6B:
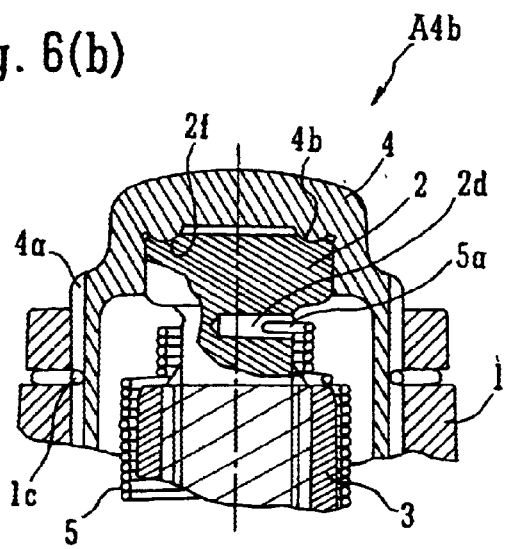
Figure 6C:
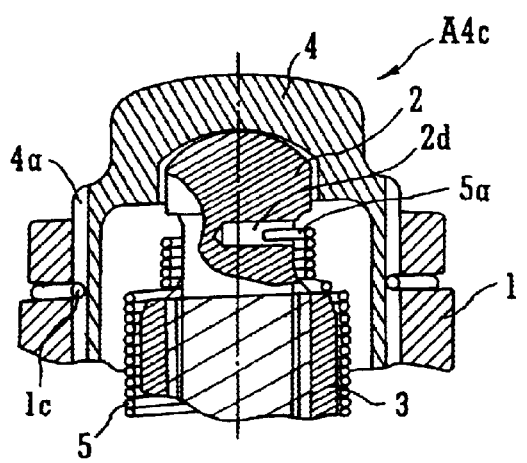

In the tensioner A4b shown in FIG. 6(b), a circumferential-shaped concave groove 2f that is formed on the upper-surface portion of the tip of the first shaft member 2 is interfitted with a circumferential-shaped convex groove 4b that is formed on the lower surface of the concave portion of the cap 4 that to be intermitted with the aforementioned concave groove 2f. Furthermore, in the tensioner A4c shown in FIG. 6(c), the tip part of the first shaft member 2 is formed as a smooth spherical shape, and the lower surface of the concave portion of the cap 4 is indented so as to parallel the aforementioned sphere face. In both of such examples, the common feature thereof is that the aforementioned slit 2a that is formed is not necessary to be formed at the tip of the first shaft member 2, and therefore the sliding part between said slit 2a and said first shaft member 2 becomes a continuous surface, so that operating stability is improved.

Figure 6D:
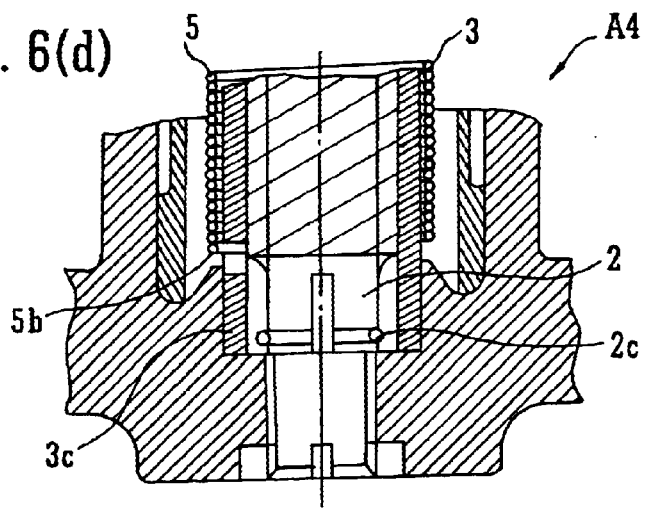

Also, in each of the tensioners A4a, A4b, and A4c of this embodiment, as shown in FIG. 6(d), the lower peripheral surface of the base end of the second shaft member 3, which functions as a rotating shaft, makes contact with the case 1 to a specified extent so as to slide on the continuous surface, as a result of which the operation of the device is further stabilized. Accordingly, the hooking portion 5b of the other end of the torsion spring 5 is fastened onto the surface of the second shaft member 3 slightly toward the center thereof.

The Fifth Embodiment

Figure 7:
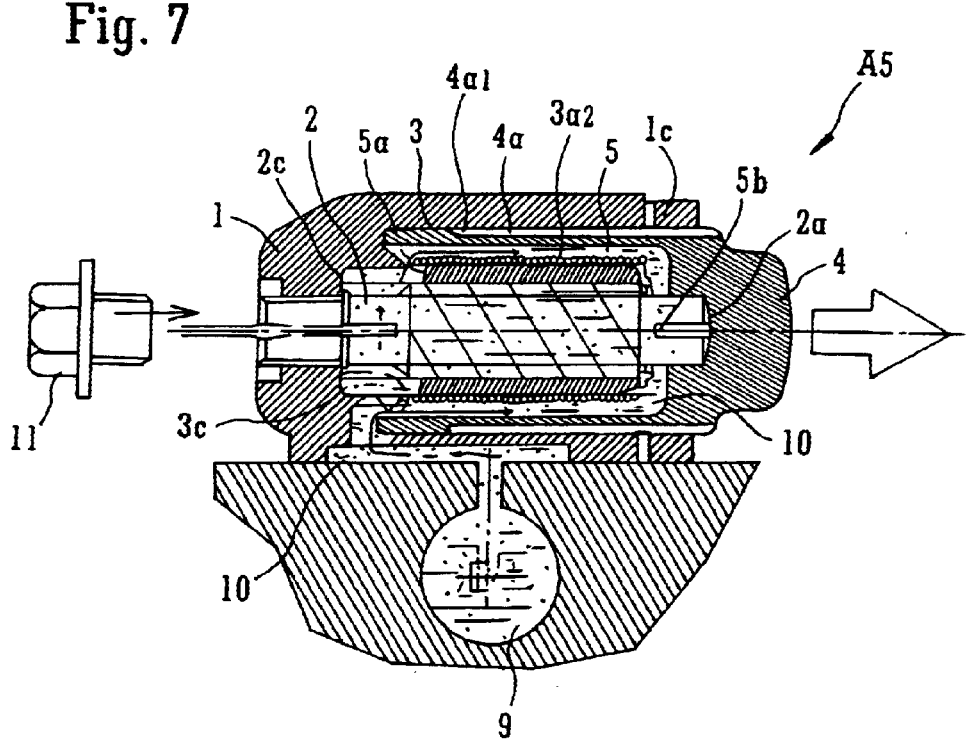
FIG. 7 is an illustration showing the tensioner A5 of the fifth embodiment.

FIG. 7 is an illustration showing the fifth embodiment of the present invention. In the tensioner A5 of this embodiment, the basic constitution and the action of the driving unit part are the same as those of the aforementioned tensioner A2 of the second embodiment, as shown in FIG. 4. However, the difference is that in this embodiment a hydraulic system is furnished to supply oil pressure in the case 1 or in the cap 4 so that said oil pressure acts so as to buffer the load from the engine. That is to say, this tensioner A5, in which a hydraulic chamber 9 is furnished, is designed so that the case 1 and the cap 4 are supplied with oil through the pipeline 10 that is connected with said hydraulic chamber 9. The very small arrows inside the device in FIG. 7 show the flow of the oil. Excess oil is discharged to the outside of the case 1 via the openings between the parts of the device. The back end of the case 1 is sealed by the sealing bolt 11. In other respects the structure the tensioner A5 and the action thereof are the same as those of the tensioner A2 of the aforementioned second embodiment, except that the tensioner A5 does not have a flange 1b.

By adopting such a hydraulic system, in the case where a high load is input from the engine, the high load is buffered by the hydraulic system so that it becomes more difficult to push back the first shaft member 3. That is to say, the oil of the hydraulic system serves to buffer the high load given to the cap 4 from the engine.

The Sixth Embodiment

Figure 8:
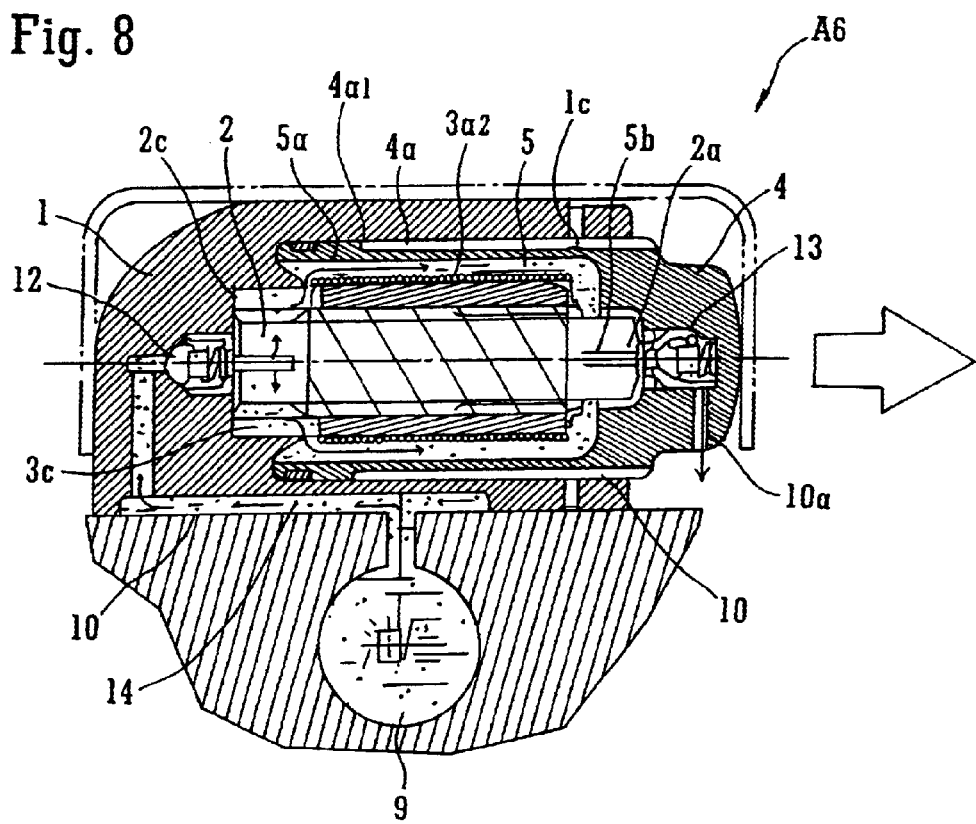
FIG. 8 is an illustration showing the tensioner A6 of the sixth embodiment.

FIG. 8 is an illustration showing the sixth embodiment of the present invention. The tensioner A6 of this embodiment is characterized such that it contains a checking valve 12 and a releasing valve 13. That is to say, the oil in the hydraulic chamber 9 passes through the pipeline 10 and flows into the case 1 and into the cap 4 by way of the checking valve 12, so as to prevent back flow of the oil, so that the specified oil pressure is maintained. If the oil pressure in the device rises above the specified value, the oil will be discharged to the outside of the case 1 through the pipeline 10a via the releasing valve 13. In the outer periphery of the back-end portion of the cap 4, an O-ring 14 is fitted as a sealing member so as to increase the tightness of the cap 4, and the tensioner is prevented from becoming a totally rigid body by the releasing valve 13, so that the buffering action can be performed more properly. In other respects, the constitution and the action of the tensioner A6 of this embodiment are the same as those of the tensioner A2 of the second embodiment and the tensioner A4 of the fourth embodiment, as described above.

The Seventh Embodiment

Figure 9A:
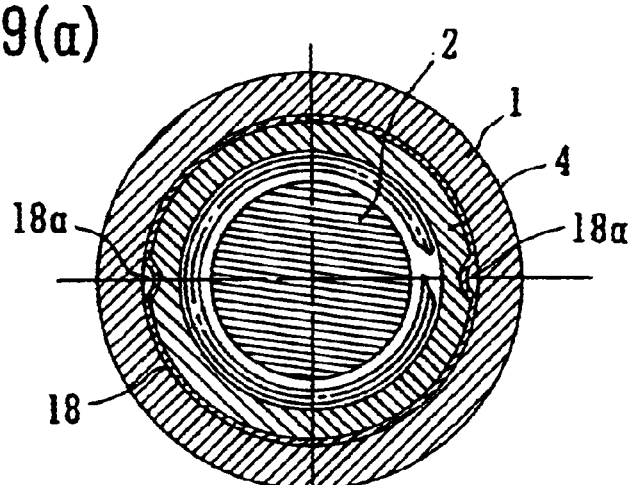
FIG. 9(a) is a cross-section view of the principal part of the main body, and 9(b) is a cross-section view along the line F.
Figure 9B:
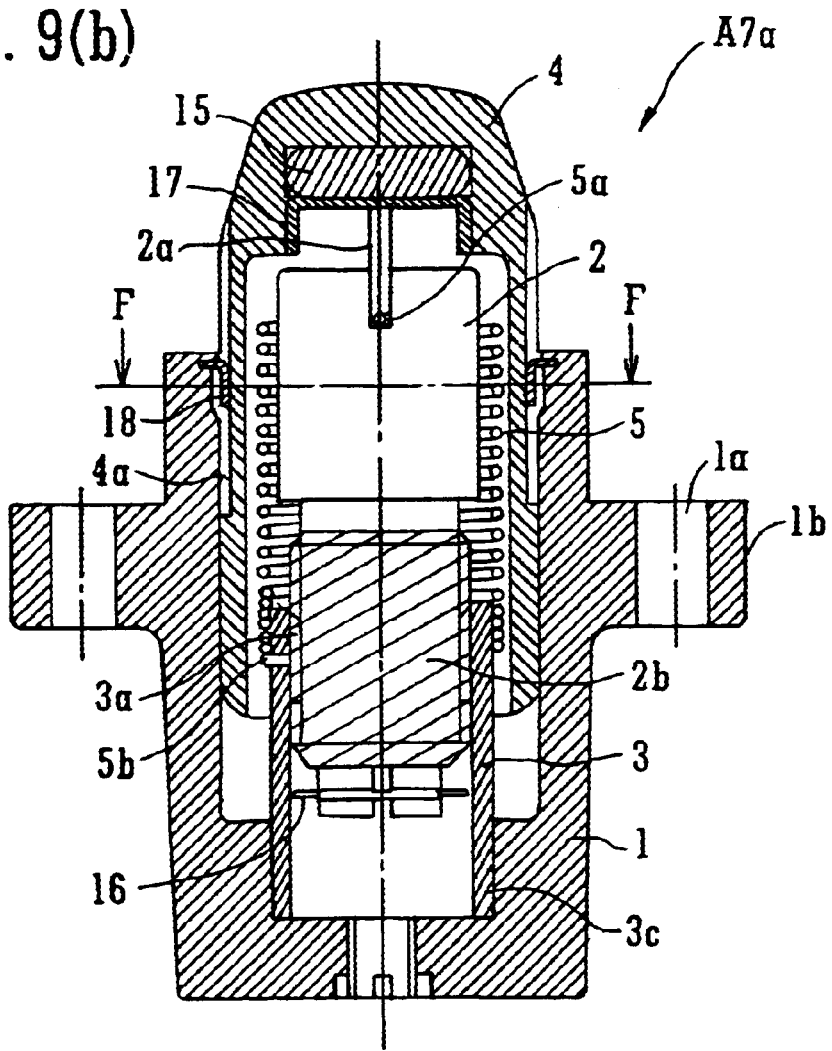
FIG. 9 contains illustrations showing the tensioner A7a of the seventh embodiment.

FIG. 9 illustrates the seventh embodiment of the present invention, and FIG. 9

(a) is a cross-section view of the principal part of the main body, while FIG. 9

(b) is a cross-section view along the line F. In the tensioner A7a of this embodiment is included an elastic member 15, such as a rubber member, to serve as a buffer between the cap 4 and the first shaft member 2. That is to say, in this tensioner A7a, a slit 2a is formed in the tip part of the first shaft member 2 and a male screw portion 2b is formed in the axial direction in the outer periphery of the part, lower than the middle, of first shaft member 2. A female screw portion 3a is formed on the inner periphery of the second shaft member 3 and is engaged with the male screw portion 2b of the first shaft member 2. Also, the lower end 3c of the second shaft member 3 makes contact with the bottom portion of the case 1, so that this is a type of tensioner in which the first shaft member 2 moves forward.

The torsion spring 5 is inserted along the outer peripheries of the first shaft member 2 and the second shaft member 3, and the hooking portion 5a of one end of said torsion spring 5 is fastened onto the slit 2a of the first shaft member 2, and the hooking portion 5b of the other end of said torsion spring 5 is fastened on the upper-side surface of the second shaft member 3. Also, in the lower-end peripheral surface of the first shaft member 2, a protruding clip 16 is installed as a stopper, and when the first shaft member 2 moves forward it makes contact with the lower end of the female screw portion 3a of the second shaft member 3 so as to prevent the first shaft member 2 from coming off the second shaft member 3.

A shaft receiver 17 is crowned on the tip of the first shaft member 2, and an elastic member 15, made of a rubber member or the like, is included between this shaft receiver 17 and the lower surface of the concave portion of the cap 4.

A collar 18 that prevents the prevent the driving unit from coming off the case 1 is fitted on the upper end of the case 1 so as to make contact with the outer peripheral surface of the cap 4. Then, as clearly shown in FIG. 9(a), at opposite sides of this collar 18, convex portions 18a, which protrudes inwardly, are formed, and longitudinal grooves 4a are formed in the cap 4 so as to correspond to one of said convex portions 18a. But these longitudinal grooves 4a are not formed on the lower side of the cap 4, so that when the cap 4 moves forward the lower ends of the longitudinal grooves 4a make contact with the coming-off-preventing collar 18 so as to prevent the driving unit from coming off the case 1.

In the tensioner A7a whose constitution is described above, when a high load from the engine is applied to the cap 4, the elastic member 15 performs a buffer action so as to prevent direct application of the high load to the torsion spring 5.

Figure 10:
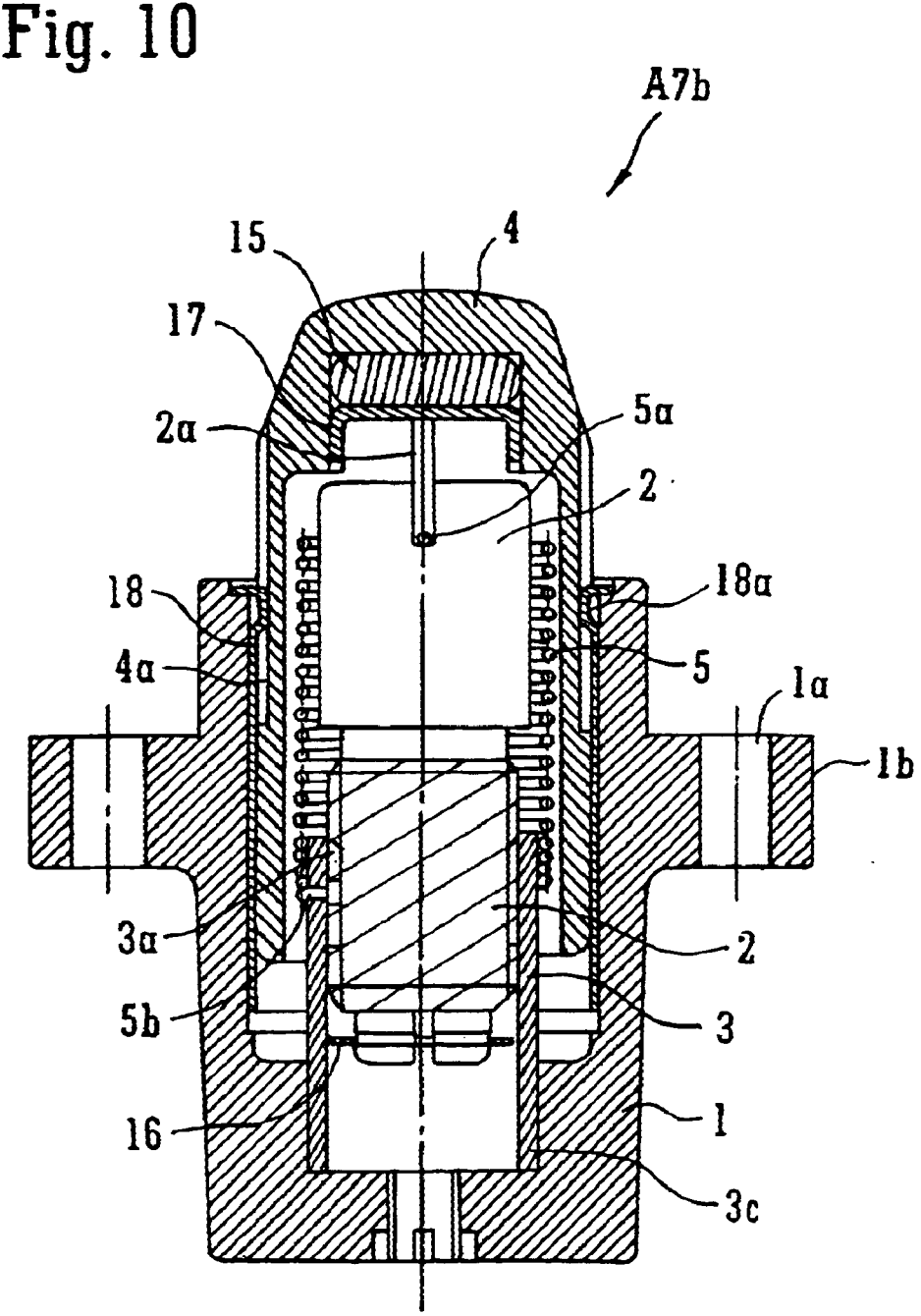
FIG. 10 is an illustration showing the tensioner A7b, another example of the aforementioned tensioner.

The tensioner A7b shown in FIG. 10 is another example of the tensioner A7a of the aforementioned seventh embodiment. In this example, the aforementioned coming-off-preventing collar extends downward so as to slide along the outer periphery of the cap 4. In this case, the aforementioned convex portion 18a is formed only at the upper-end portion. The sliding durability of this aforementioned coming-off-preventing collar 18 can be improved by making it of a strong material to which heat processing or the like has been applied. In other respects the constitution and the action of the tensioner A7b are the same as those of the tensioner A7a shown in FIG. 9, as described above.

The Eighth Embodiment

Figure 11:
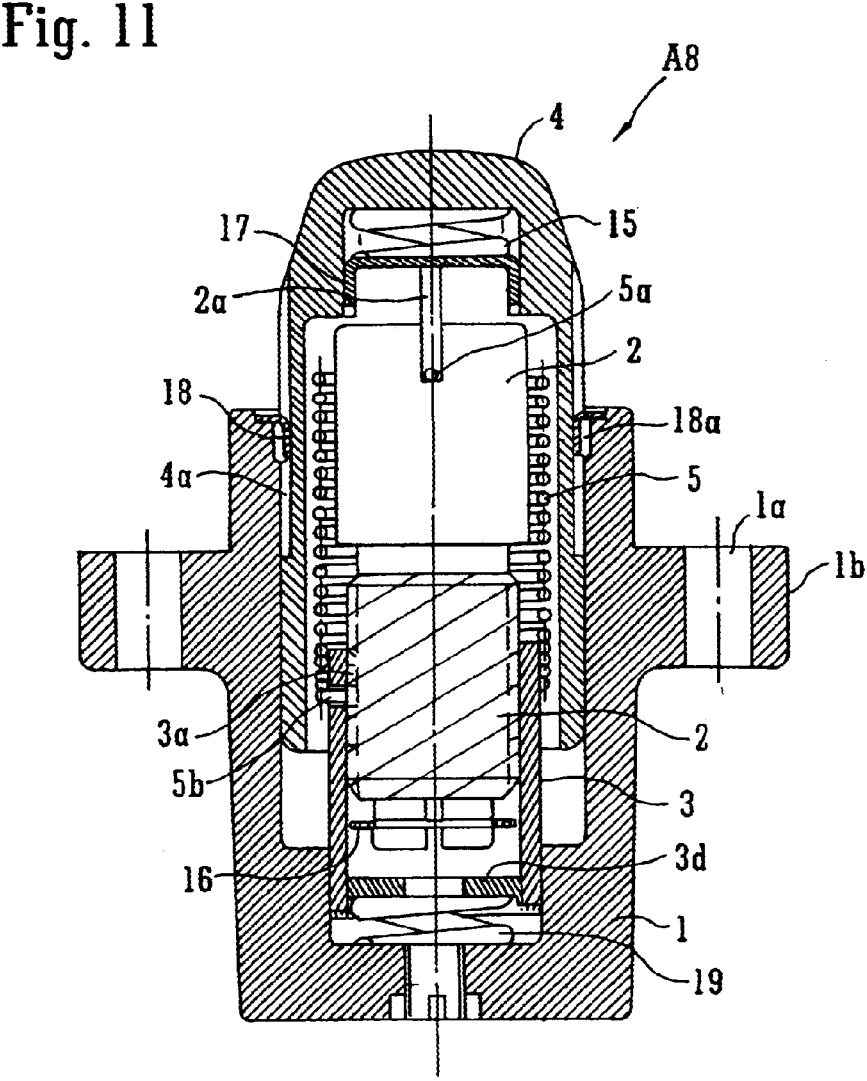
FIG. 11 is an illustration showing the tensioner A8 of the eighth embodiment.

FIG. 11 is an illustration showing the eighth embodiment of the present invention. The constitution and the action of the tensioner A8 of this embodiment are basically the same as those of the aforementioned tensioner A7a of the seventh embodiment, as shown FIG. 9, but it differs in that a spring body is used for the aforementioned elastic member 15 and that an elastic member that is to perform a buffer action is included in the bottom portion of the second shaft member 3. That is to say, although rubber or the like is used for the elastic member 15 of the aforementioned tensioner A7a, a spring body is used for the elastic member 15 of the tensioner A8 of this embodiment. Also, an elastic member 19 that is to perform a buffer action is included between the dividing plate 3d that is installed on the bottom surface of the second shaft member 3 and the bottom surface of the concave portion of the lower portion of the case 1.

As described above, such elastic members are included in both of the upper and lower parts, so that, prior to the tension operation of the torsion spring 5, a strong buffer action against the high load from the engine can be performed.

The Ninth Embodiment

Figure 12:
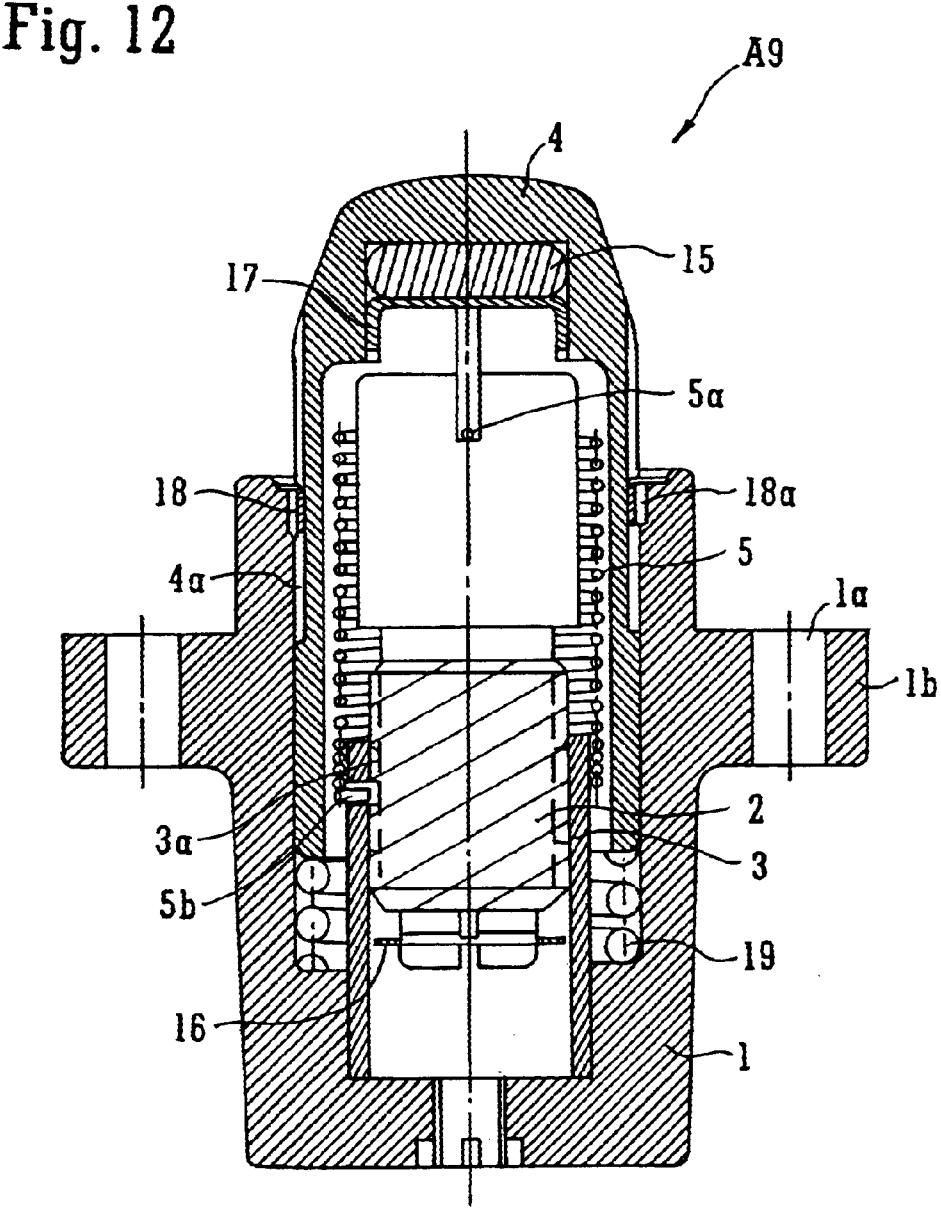
FIG. 12 is an illustration showing the tensioner A9 of the ninth embodiment.

FIG. 12 is an illustration showing the ninth embodiment of the present invention. The constitution and the action of the tensioner A9 of this embodiment are basically the same as those of the tensioner A7a of the seventh embodiment shown FIG. 9 and of the tensioner A8 of the eighth embodiment shown in FIG. 11, but this tensioner A9 is different in regard to the elastic members 15 and 19 that are included as buffer members. That is to say, although this tensioner A9 is the same as the tensioner A7a shown in the aforementioned seventh embodiment in that an elastic member 15 made of rubber is included in the tip portion of the first shaft member 2, in this tensioner A9 the spring body that is included as an elastic member 19 in the lower portion is installed so that, in the spacious part between the second shaft member 3 and the case 1, the upper portion of the spring body makes contact with the lower end of the second shaft member 3. This tensioner A9 differs from the aforementioned tensioner A8 in that this tensioner A9 does not need a dividing plate 3d such as that which is installed on the bottom surface of the second shaft member 3 of tensioner A8, and therefore the constitution of the device is simpler in that respect.

The Tenth Embodiment

Figure 13:
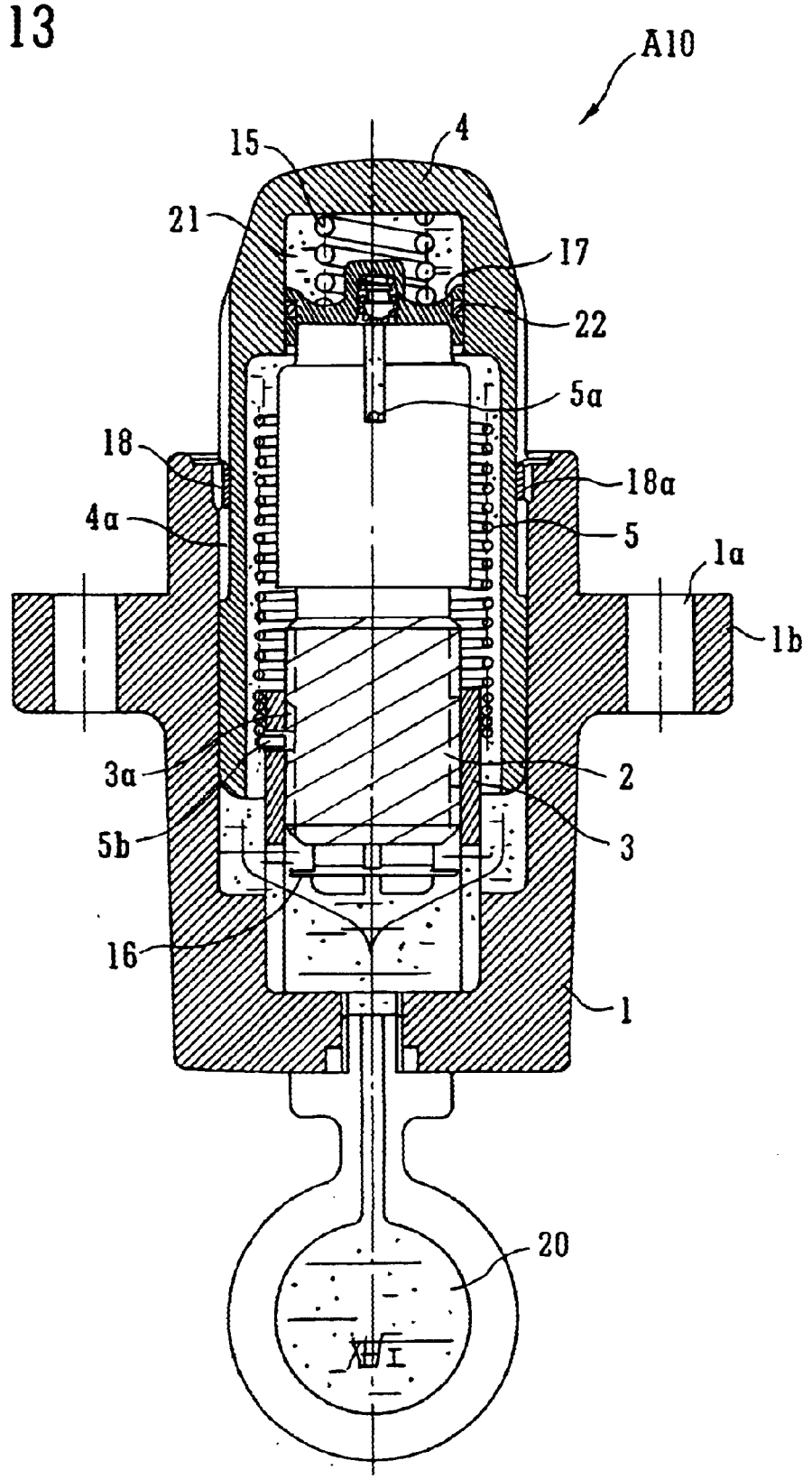
FIG. 13 is an illustration showing the tensioner A10 of the tenth embodiment.

FIG. 13 is an illustration showing the tenth embodiment of the present invention. The tensioner A10 of this embodiment is one wherein the buffer system composed of a rubber body or a spring body as the aforementioned elastic members 15 or 19 in the aforementioned tensioners A7a, A7b, A8, and A9 shown in FIG. 9 and succeeding drawings, is replaced by a spring body and a hydraulic system, while in other respects the constitution is the same as those of the aforementioned tensioners shown in FIG. 9 and the succeeding drawings. That is to say, a hydraulic chamber is furnished in the lower portion of the case of this tensioner A10, so as to supply the interior of the case 1 with oil pressure. The arrows shown in the drawings illustrate the passage through which the oil flows. The oil flows between the first shaft member 2, in which the torsion spring 5 is inserted and the second shaft member 3, passing through the space formed by the cap 4 and the first shaft member 2 by way of the inside of the second shaft member 3 from the lower portion of the case 1.

The concave portion in the upper side of the cap 4 is an oil sump 21, in which the shaft receiver 17 moves up and down in contact with the tip portion of the first shaft member 2. Also, a buffer member 15 made of rubber is included between this shaft receiver 17 and the lower surface of the concave portion of the cap 4.

In the aforementioned shaft receiver 17, the peripheral surface thereof makes contact with the inner peripheral surface of the cap 4 under the condition such that said shaft receiver 17 can slide back and forth. Also, in the peripheral surface of said shaft receiver 17, a seal member 22 is installed to seal the oil sump 21. In this seal member 22, an appropriate opening is furnished so as to let out oil, as a result of which this region is temporarily prevented from being totally rigid.

In this way, the tensioner A10 of this embodiment is designed to resist the high load from the engine by means of the spring body and the oil pressure buffer system.

The Eleventh Embodiment

FIGS. 14(a)–(c) show a tensioner A11 as the seventh embodiment of the present invention. FIG. 14(a) is a cross-section view of the principal part of the main body, FIG. 14(b) is a cross-section view through the line G, and FIG. 14(c) is a cross-section view through the line H.

In those figures, the constitution and the action of the tensioner A11 are the same as those of the aforementioned embodiments in that: (1) in the case 1 is furnished a flange 1b that has an installing hole 1a; (2) a collar 18 is furnished in the upper end of the case 1; (3) a convex portion 18a that partially protrudes into this collar 18 is furnished; (4) a longitudinal groove 4a is formed in the region corresponding to the aforementioned convex portion 18a in the cap 4 that slides on said collar 18; (5) the lower-end portion of this longitudinal groove 4a makes contact with the aforementioned convex portion 18a of the cap 4 so as to constitute a coming-off-preventing system; (6) a clip 16 protruding toward the periphery is installed in the lower portion of the first shaft member and, when the first shaft member 2 moves forward, the clip 16 makes contact with the lower portion of the female screw portion 3a of the second shaft member 3 so as to constitute a coming-off-preventing system; and (7) a shaft receiver 17 is crowned on the tip portion of the first shaft member 2, and this shaft receiver 17 slides on the lower surface of the concave portion of the cap 4.

The tensioner A11 of this embodiment differs from the tensioners described in each of the aforementioned embodiments in that: (1) a power spring 23 is used instead of the aforementioned torsion spring 5; (2) one end of the power spring 23 is fastened onto the cap 4, not on the second shaft member 3; and (3) a connecting body 24 is included between the inner peripheral surfaces of the second shaft member 3 and the cap 4.

As shown in the cross-section view of FIG. 14(c), the outer peripheral surface of the second shaft 3 and the inner peripheral surface of the connecting body 24, and also the outer peripheral surface of this connecting body 24 and the inner peripheral surface of the cap 4, are formed in noncircular shapes so as to interfit with each other. Therefore, the second shaft member 3, the connecting body 24, and the cap 4 rotate as one body.

The power spring 23 is wound up in the upper position of the first shaft member 2 and one end 23a thereof is fastened onto the slit 2a of the first shaft member 2, while the other end 23b of the power spring 23 is fastened onto the fastening hole 4e that is formed on the side surface of the cap 4. As described above, the cap 4 and the second shaft member 3 rotate as one body, and therefore the other end 23b of the aforementioned power spring 23 performs the same action if it is fastened onto the cap 4 or onto the second shaft member 3.

In this embodiment, the power spring 23 is used instead of the torsion spring 5, and as a result the overall length of the tensioner can be reduced.

Further, a constitution as a result of which the torsion spring 5 in each of the aforementioned embodiments is substituted by a power spring 23, as in this embodiment, also is possible.

The Twelfth Embodiment

Figure 17A:
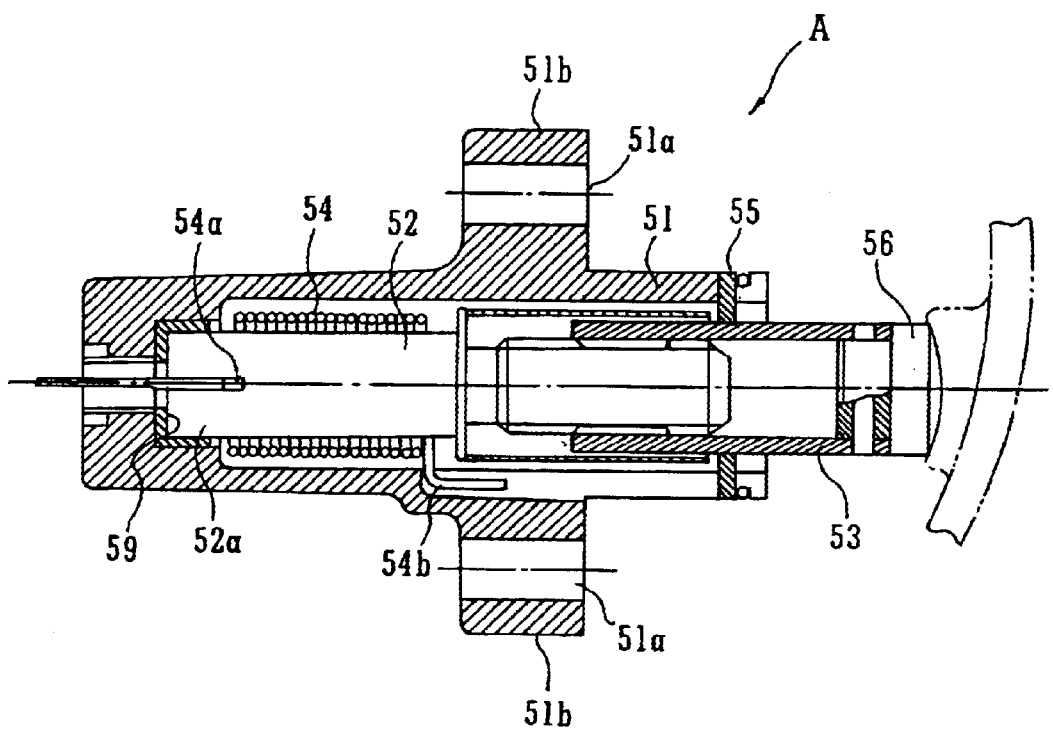
FIG. 17(a) is an illustration showing a tensioner conventionally used.
Figure 17B:
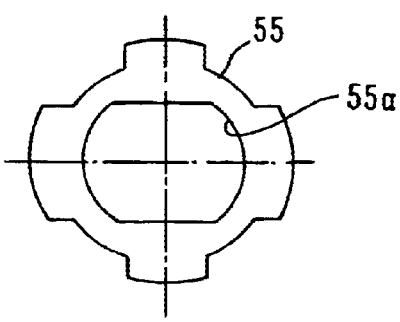
FIG. 17(b) is a cross-section view of the bearing thereof.
Figure 18:
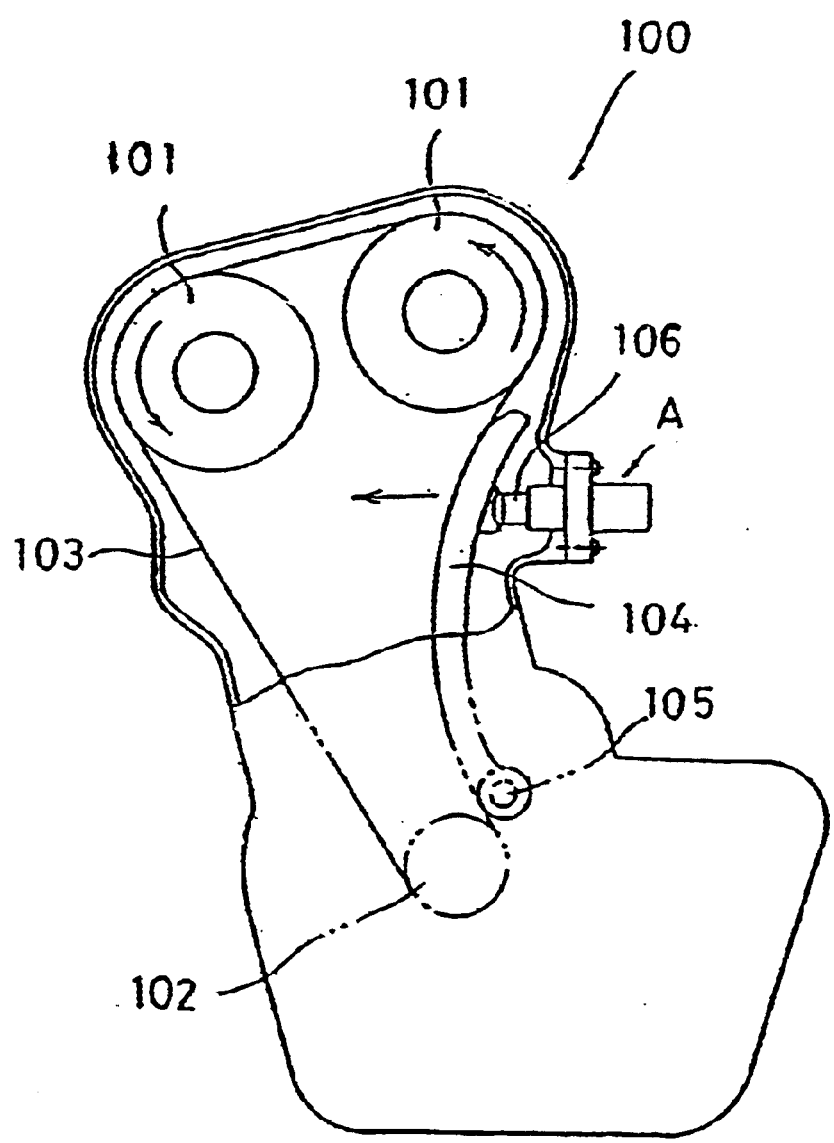
FIG. 18 is an illustration showing an example of a tensioner that is actually installed in the main body of an engine.

FIG. 15 is an illustration showing the twelfth embodiment of the present invention. In the tensioner A12 of this embodiment, the basic constitution is the same as that of the conventional tensioner A shown in FIG. 17. That is to say, it basically consists of the case 1, the flange 1b, in which an installing hole 1b is formed, the first shaft member 2, the slit 2a, the second shaft member 3, the head member 28, the torsion spring 5, the hooking portion of the ends 5a and 5b, the shaft receiver 6, and the sealing bolt 7.

Figure 15A:
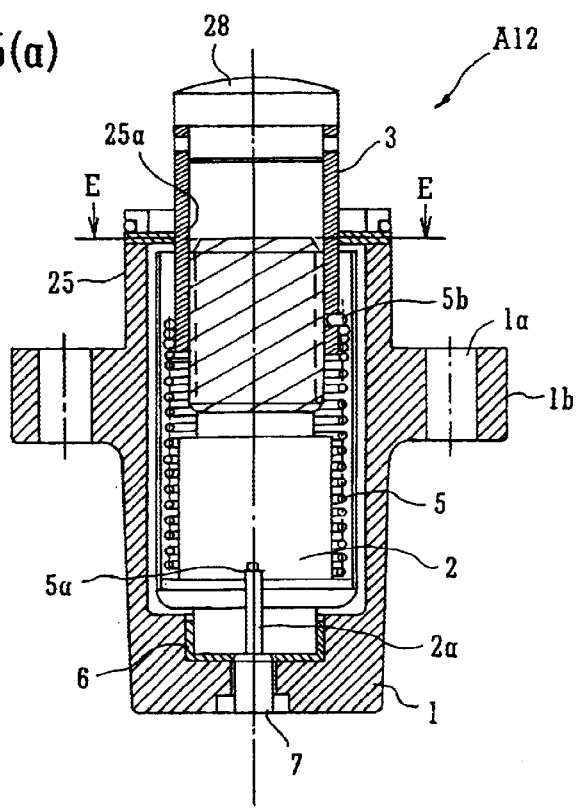
FIG. 15(a) is an illustration showing the tensioner A12 of the twelfth embodiment.
Figure 15B:
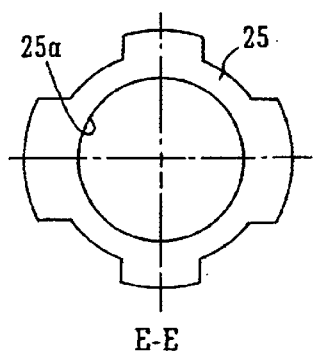
FIGS. 15(b), 15(c), and 15(d) are cross-section views of the bearing thereof.

However, this tensioner A12 differs from the aforementioned conventional tensioner A in that the hooking portion 5b of the other end of the torsion spring 5 is fastened onto the side surface of the second shaft member 3, not on the case 1. It also differs in that the interfitting hole 25a of the bearing 25 to bear the second shaft member 3 can be in a circular shape, as shown in FIG. 15(b). In this example, as described above, the tensioner A12 is designed to function without limiting the rotation of the second shaft member 3; that is to say, the second shaft member 3 as a drive shaft in the aforementioned conventional tensioner is designed to proceed while rotating.

Figure 15C:
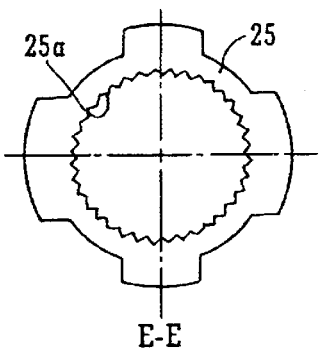
Figure 15D:
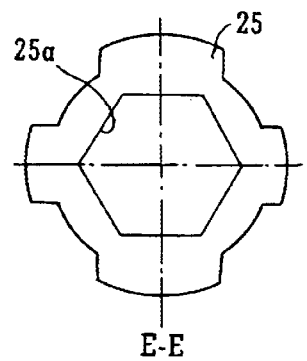

FIGS. 15(c) and 15(d) shows examples of other shapes of the bearing 25. FIG. 15(c) shows an example of a bearing 25 that has notches on its inner peripheral portion, while the bearing 25 shown in FIG. 15(d) has a hexangular shape. If a bearing 25 as shown in either FIG. 15(b) or 15(c) is used, the rotation of the second shaft member 3 is limited.

Further, the bearing 25 can be formed in one body with the case 1. In such a case, the second shaft member 3 slides directly on the case 1.

The Thirteenth Embodiment

Figure 16:
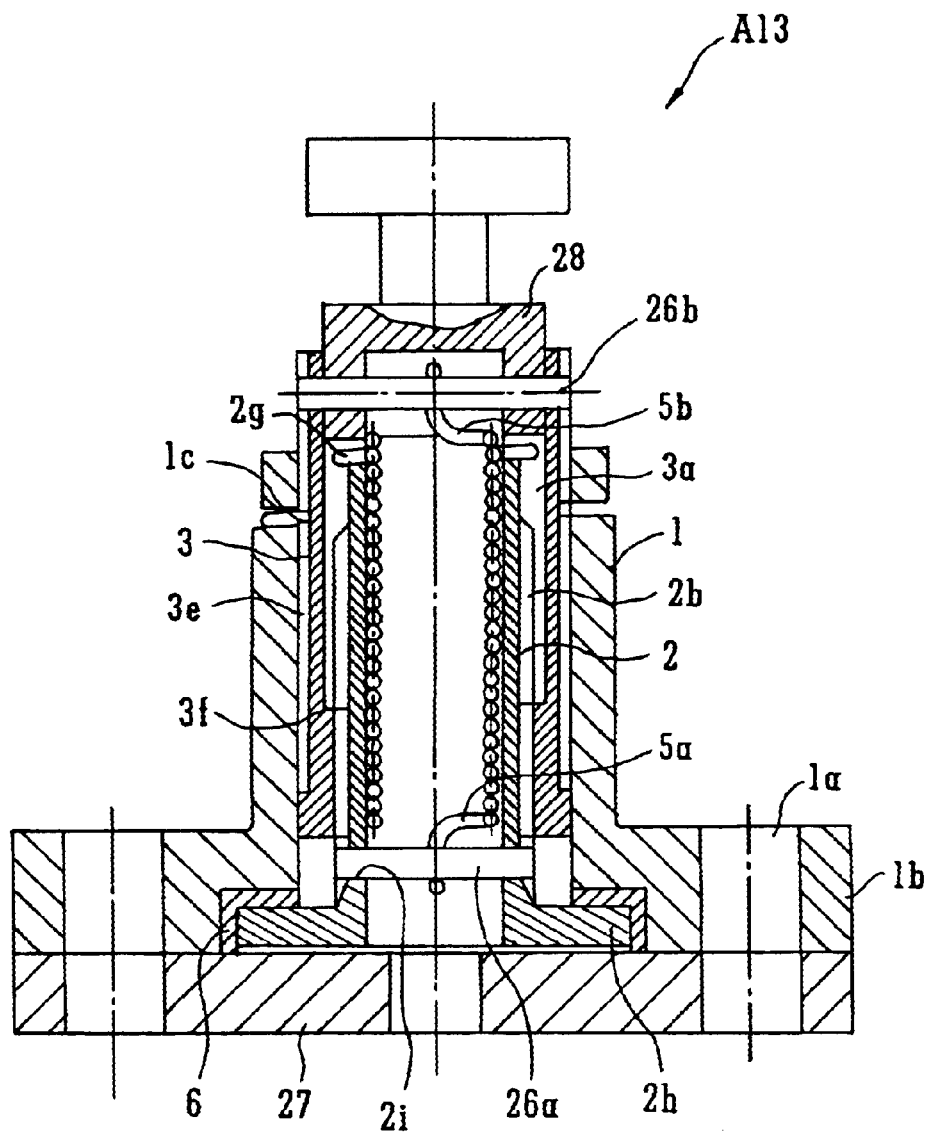
FIG. 16 is an illustration showing the tensioner A13 of the thirteenth embodiment.

FIG. 16 is an illustration showing the thirteenth embodiment of the present invention. The tensioner A13 of this embodiment is a tensioner that acts in the pulling direction (in the upper direction in the drawing). That is to say, while the tensioners A1a-A12 in the aforementioned embodiments are tensioners that act in the pushing direction, the tensioner A13 of this thirteenth embodiment is so designed that the force acts in the pulling direction by setting the winding direction of the torsion spring 5 to be the opposite of the winding direction of the aforementioned embodiments, though the basic constitution of this tensioner A13 is the same as that of the tensioner A3 (as shown in FIG. 5), whose torsion spring 5 is stored in the first shaft member 2.

In FIG. 16, the first shaft member 2 is hollow, and the torsion spring 5 is inserted inside it. In this torsion spring 5, the winding direction is set to be the opposite of that of the torsion springs 5 of the aforementioned embodiments. Also, a slot 2i is formed in the lower-end portion of the first shaft member 2, a pin 26a that makes a right angle in the axial direction is inserted into this slotting portion, and the hooking portion 5a of one end of the torsion spring 5 is fastened onto said pin 26a. In the lower portion of the first shaft member 2, a supporting portion 2h protrudes toward the circumference, while in the lower portion of the case 1 is installed a shaft receiver 6 that receives the aforementioned supporting portion 2h. This tensioner A13 acts in the pulling direction as described above, as a result of which the shaft receiver 6 supports the upper side of the supporting portion 2. A base stand 27 is installed by use of an installing bolt (not shown in the drawing) that is inserted into the flange 1b of the tensioner A13.

In other respects—that is to say, the constitution of the snap ring 1c that is furnished on the inner peripheral surface of the upper portion of the case 1, the longitudinal groove 3e that is furnished on the outer peripheral part of the second shaft member 3, the stopper 2g that is furnished at the upper end of the first shaft member 2—the tensioner A13 is constituted the same as that of the third embodiment shown in FIG. 5. Also, the action thereof is the same as that of the aforementioned tensioner A3 except that it acts in the pulling direction as described above.

Further, the present invention is not limited to the aforementioned embodiments, and it is taken for granted that the present invention can take a variety of forms within the scope of the technological ideas set forth in the claims.

For example, either of the first shaft member 2 or the second shaft member 3, which constitutes the driving unit, can be fixed onto the case 1 or on the cap 4.

A variety of methods can be used for such fixation, such as press-fitting of the shaft member to be fixed, interfitting of diameter holes of different sizes, or using a hole bearing of a different diameter, among others.

Further, the structure that prevents the driving unit from coming off the tensioner need not be furnished if there is sufficient space so that a sufficient drive shaft stroke can be secured.

As described above, according to the present invention, when the tensioner is disassembled for the maintenance purpose or the like, the driving unit can be removed without itself being disassembled, because the first shaft member 2, the second shaft member 3, the cap 4 (the head member 28), and the torsion spring 5 (the power spring 23) are assembled as one body to compose a driving unit, as a result of which the initial load of the torsion spring is kept as is, so that it is not necessary to give the initial load to the torsion spring when reassembling the tensioner. As a result, the assembling work can be simplified, and the value of the initial torque of the torsion spring can be retained accurately.

Also, because it is not necessary for the drive shaft to have a noncircular shape, the time required to produce the drive shaft can be reduced.

Also, because the hooking portion of the spring is fastened in the axial direction onto the middle region of the shaft, said fastening can be done easily.

Also, because the two shaft members that compose a set are prevented from coming off of each other, and also because the driving unit is prevented from coming off of the case, the safety of the tensioner is improved.

Also, because there is furnished a hydraulic system that applies, in the same direction as the driving direction of the shaft member, oil pressure to the load that is input to the aforementioned driving unit, the hydraulic system is first operated to serve as a buffer to the load when a high load is input from the engine, as a result of which the tensioner is adaptable to a wide range of loads, from high to low.

Furthermore, in a tensioner that contains the cap 4 in the case 1 so as to contact the case 1 and to slide, the contacting surface or the sliding surface between the cap 4 and the case 1 becomes wider, so that sliding stability is improved when the tensioner moves back and forth, and operating stability is improved because the drive shaft member is enabled to rotate and slide coaxially when the tensioner is constituted so that both the shaft member that is rotating as a base end and the cap 4 are supported in the case 1.

| Explanation of Numbers in the Drawings | |
|---|---|
| 1 | Case |
| 1a | Installing hole |
| 1b | Flange |
| 1c | Snap ring |
| 2 | First shaft member |
| 2a | Slit |
| 2b | Male screw portion |
| 2b1 | Lower portion of male screw portion |
| 2c | Stopper |
| 2d | Fastening hole |
| 2e | Edge |
| 2f | Circumferential-shaped concave groove |
| 2g | Stopper |
| 2h | Supporting portion |
| 2i | Slot |
| 3 | Second shaft member |
| 3a | Female screw portion |
| 3a1 | Upper end of female screw portion |
| 3a2 | Lower end of female screw portion |
| 3b | Protruding portion |
| 3c | Lower end of second shaft member |
| 3d | Dividing plate |
| 3e | Longitudinal groove |
| 3f | Lower-end portion of second shaft member |
| 4 | Cap |
| 4a | Longitudinal groove |
| 4a1 | Lower end of longitudinal groove |
| 4b | Circumferential-shaped convex groove |
| 4e | Fastening hole |
| 5 | Torsion spring |
| 5a, 5b | Hooking portion |
| 6 | Shaft receiver |

-continued

Explanation of Numbers in the Drawings

| | |
|---|---|
| 7 | Sealing-bolt hole |
| 8 | Ring |
| 9 | Hydraulic chamber |
| 10 | Pipeline |
| 10a | Pipeline |
| 11 | Sealing bolt |
| 12 | Checking valve |
| 13 | Releasing valve |
| 14 | O-ring |
| 15 | Elastic member |
| 16 | Clip |
| 17 | Shaft receiver |
| 18 | Collar |
| 18a | Convex portions |
| 19 | Elastic member |
| 20 | Hydraulic chamber |
| 21 | Oil sump |
| 22 | Seal |
| 23 | Power spring |
| 23a | One end of power spring |
| 23b | Other end of power spring |
| 24 | Connector |
| 25 | Bearing |
| 25a | Interfitting hole |
| 26a, 26b | Pin |
| 27 | Base stand |
| 28 | Head member |
| 51 | Case |
| 51a | Hole |
| 51b | Flange |
| 52 | Rotating shaft |
| 52a | Back-end portion of rotating shaft |
| 53 | Drive shaft |
| 54 | Torsion spring |
| 54a | One end of torsion spring |
| 54b | Other end of torsion spring |
| 55 | Bearing |
| 55a | Drive-shaft hole |
| 56 | Cap |
| 59 | Interfitting hole |
| 100 | Engine |
| 101 | Cam sprockets |
| 102 | Crank sprocket |
| 103 | Timing chain |
| 104 | Curve-shaped chain guide |
| 105 | Base portion |
| 106 | Retractable and extensible drive shaft |

What is claimed is:

1. A tensioner, comprising:

first and second shaft members that are threadedly engaged;

a spring having first and second hooking portions located at opposite ends of said spring and fastened to said first and second shaft members, respectively, said spring applying a rotational force to said first and second shaft members;

a case into which said shaft members and said spring are inserted, said case supporting said first shaft member; and a cap that is slidably supported by the case, supports said second shaft member, and extends so as to cover the outsides of both said first and second shaft members, said cap having an outer surface that slides on an inner surface of the case so that the sliding movement of said cap is supported by the case;

wherein said shaft members, said spring, said case and said cap are coaxially aligned and arranged in the following order, from inside to outside: said second shaft member, said first shaft member, said spring, said cap and said case.

2. The tensioner of claim 1, further comprising a hydraulic system that applies a hydraulic pressure to a space defined by both said case and said cap.

3. A tensioner, comprising:

first and second shaft members that are threadedly engaged;

a spring having first and second hooking portions located at opposite ends of said spring and fastened to said first and second shaft members, respectively, said spring applying a rotational force to said first and second shaft members;

a case into which said shaft members and said spring are inserted, said second shaft member being supported by said case; and a cap slidably supported by the case, said first shaft member being supported by said cap which extends so as to cover the outsides of both said first and second shaft members, said cap having an outer surface that slides on an inner surface of the case so that the sliding movement of said cap is supported by the case;

wherein said shaft members, said spring, said case and said cap are coaxially aligned and arranged in the following order, from inside to outside: said second shaft member, said first shaft member, said spring, said cap and said case.

4. The tensioner of claim 3, further comprising a hydraulic system that applies a hydraulic pressure to a space defined by both said case and said cap.

* * * * *